United States Patent [19]
Ekelund

[11] Patent Number: 4,717,014
[45] Date of Patent: Jan. 5, 1988

[54] SCREW CONVEYOR

[75] Inventor: Åke Ekelund, Helsingborg, Sweden

[73] Assignee: AB Siwertell, Bjuv, Sweden

[21] Appl. No.: 931,441

[22] PCT Filed: Jan. 23, 1986

[86] PCT No.: PCT/SE86/00022
§ 371 Date: Sep. 26, 1986
§ 102(e) Date: Sep. 26, 1986

[87] PCT Pub. No.: WO86/04566
PCT Pub. Date: Aug. 14, 1986

[30] Foreign Application Priority Data
Feb. 7, 1985 [SE] Sweden .................. 8500570

[51] Int. Cl.⁴ ........................................... B65G 65/16
[52] U.S. Cl. .................................. 198/518; 198/662; 198/658
[58] Field of Search ............... 198/616, 662, 671, 670, 198/661, 518, 663, 672, 518; 414/139

[56] References Cited
U.S. PATENT DOCUMENTS

| | | | |
|---|---|---|---|
| 2,467,682 | 4/1949 | Megargee | 198/662 X |
| 2,709,075 | 5/1955 | August | 198/662 X |
| 3,019,895 | 2/1962 | Lovenstein et al. | 198/662 X |
| 3,596,751 | 8/1971 | Siwersson et al. | 198/64 |
| 3,685,638 | 8/1972 | Siwersson et al. | 198/608 |
| 4,467,910 | 8/1984 | Siwersson et al. | 198/658 X |
| 4,492,302 | 1/1985 | Svens | 198/671 |

Primary Examiner—James T. McCall
Attorney, Agent, or Firm—Browdy and Neimark

[57] ABSTRACT

A screw conveyor has a feeder device for promoting the supply of material to the screw, said feeder device and said screw being rotatable in opposite directions. The feeder device has blades (14, 15) which are curved in the manner of a trawl to draw in the material both from above and from below and to guide it inwardly towards the interior of said feeder device.

4 Claims, 9 Drawing Figures

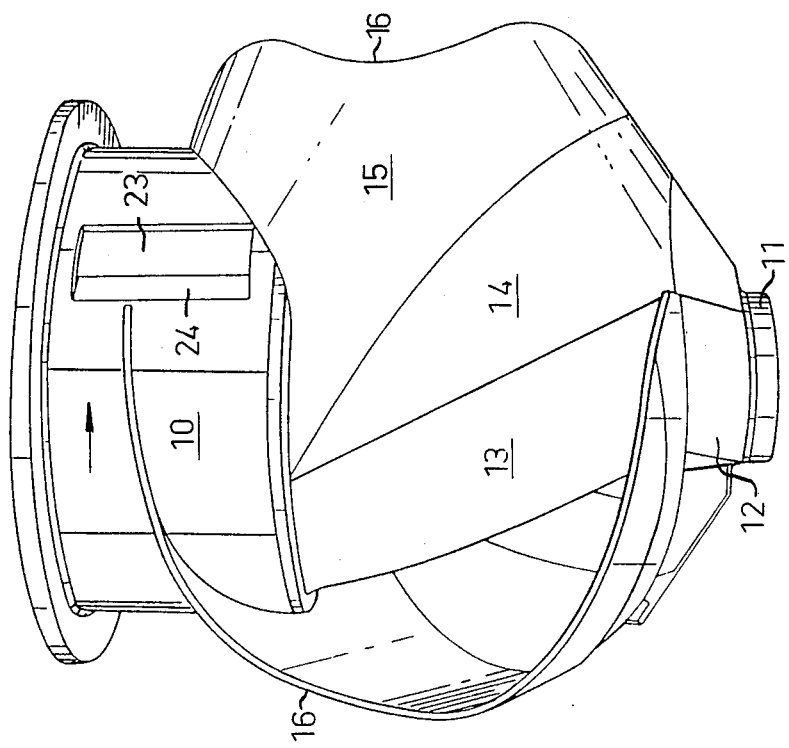
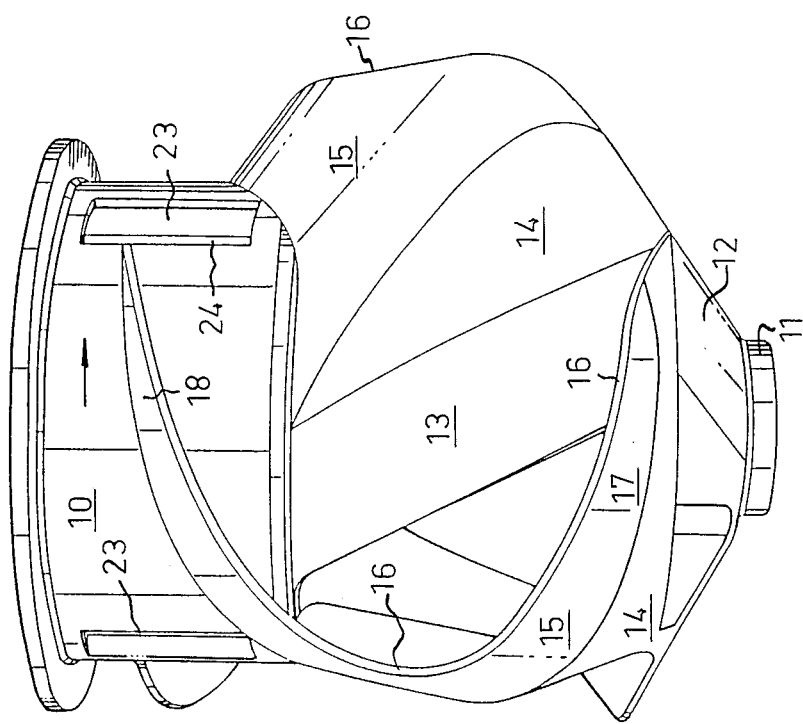

SCREW CONVEYOR

BACKGROUND OF THE INVENTION

The present invention relates to a screw conveyor for bulk material. Such screw conveyors have a housing and a conveyor screw mounted therein, said housing and said conveyor screw being relatively rotatable. Usually, the housing is stationary and the conveyor screw is rotatable within the housing. In order to promote the supply of material into the screw conveyor, various types of feeder devices have been proposed. Examples of such feeder devices are those disclosed in U.S. Pat. No. 3,596,751 and European patent specification EP-A-57,167. These devices are of the type in which the screw and the feeder device are rotated in opposite directions. The object of the feeder device is to positively supply the material into the screw, such that the screw can efficiently grab and convey the material through the screw conveyor.

Although the known feeder devices have proved highly efficient, there is room for improvements. Frequently, these devices are such that they cannot operate efficiently if the screw conveyor is inclined relative to the vertical plane. Since such screw conveyors often are included in an unloader for the unloading of, for example, ships, it is essential that the operator be able to incline the conveyor such that it can reach right into the corners and underneath the hatch edges of the ship's hold. At the same time, it should be possible to unload the material as completely as possible also in these difficultly accessible spots, thereby to reduce the need for special equipment to clean these spots and to move the material within reach of the screw conveyor or the unloading device.

The arrangement according to European patent specification EP-A-57,167 comprises a feeder wing in the form of a planar helix, as a result of which the feeder device can operate efficiently only when it is directed exactly vertically so that the planar helix sweeps across the bottom of the hold. The commercially available practical embodiments of the feeder device according to the U.S. Pat. No. 3,596,751 are better in this respect since they function fairly well also when the vertical conveyor is inclined. However, also this type of feeder device has tended to leave material behind and to thump mechanically against the bottom of the hold.

SUMMARY OF THE INVENTION

The present invention aims at providing a screw conveyor which is superior to prior art constructions in that it operates satisfactorily and is subjected to a lesser degree to mechanical strain when the screw conveyor is inclined. To this end, the screw conveyor according to the invention is designed in the manner defined by the appended claims.

The invention will be described in more detail below, reference being had to the accompanying drawings.

BRIEF DESCRIPTION OF THE DRAWINGS

FIGS. 1-7 are different views of the feeder device proper of the screw conveyor, FIGS. 1, 2, 3, 5, and 4 in that order being respective views at successive rotation angles of the feeder device, as indicated by arrows I to V in FIG. 6, FIGS. 6 and 7 being views from different tilted angles.

DESCRIPTION OF PREFERRED EMBODIMENTS

Figure 4:
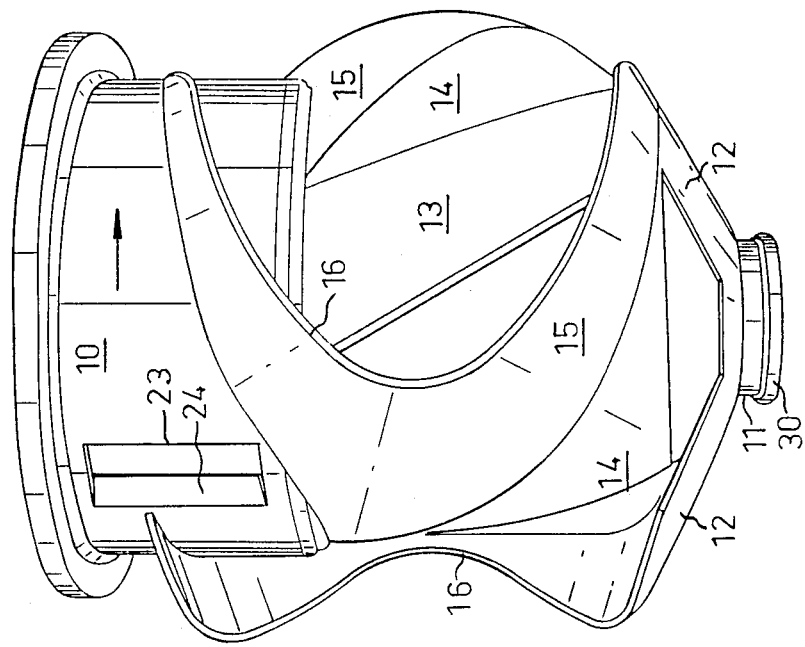
Figure 3:
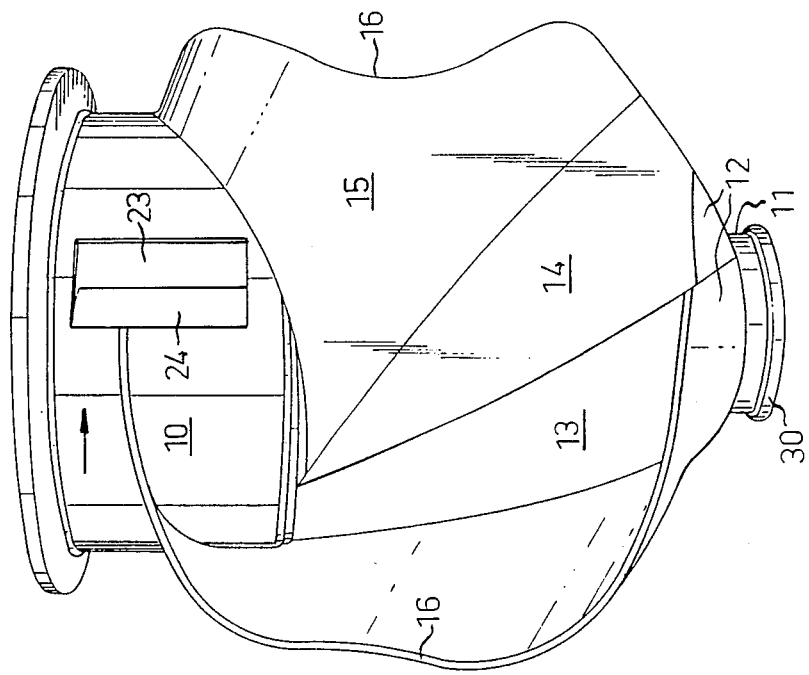
Figure 6:
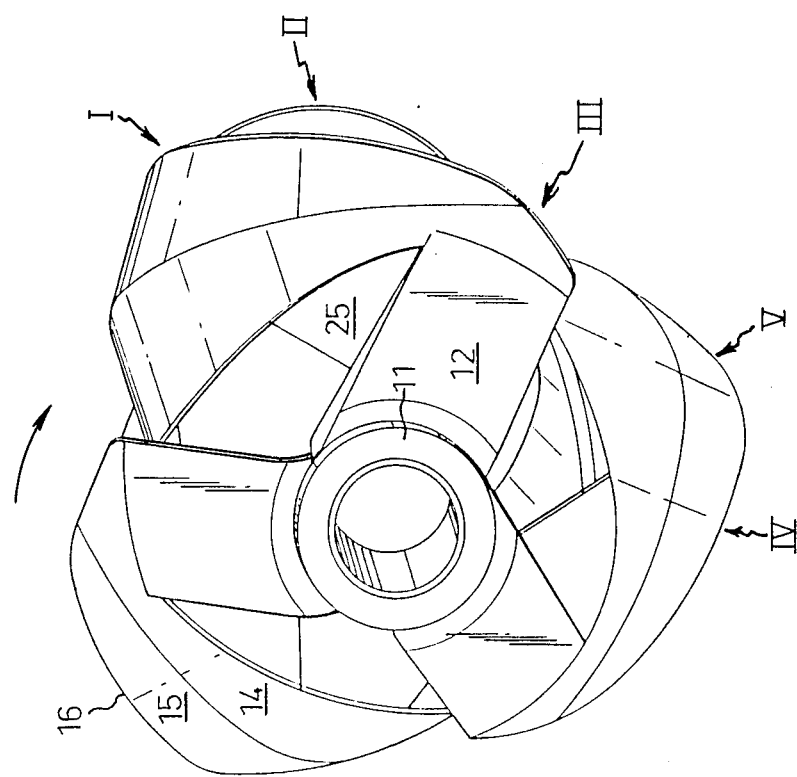
Figure 5:
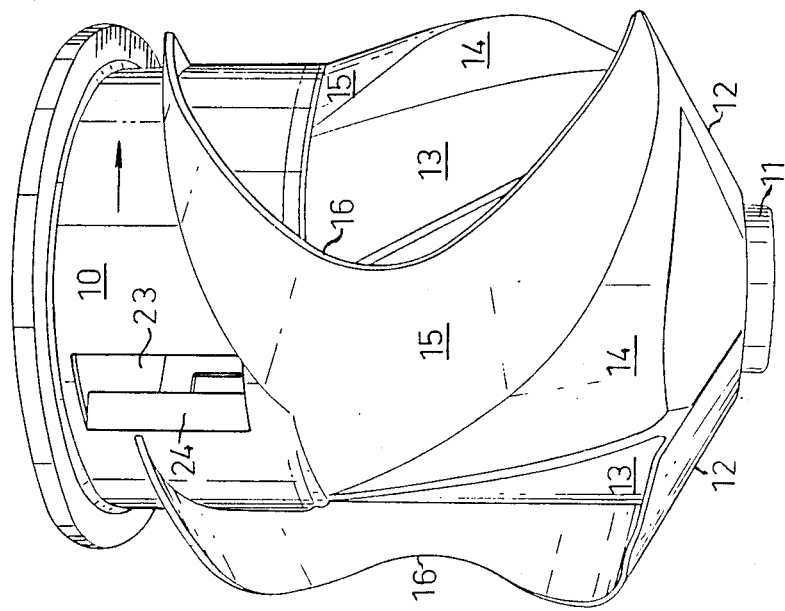
Figure 8:
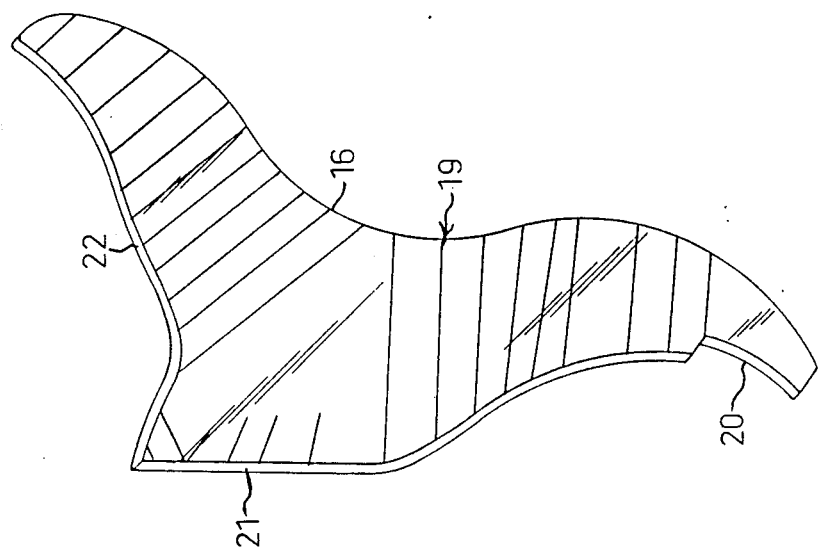
FIG. 8 illustrates an example of a metal plate or sheet in planar form which may be used for making a blade in a screw conveyor feeder device according to the invention.
Figure 7:
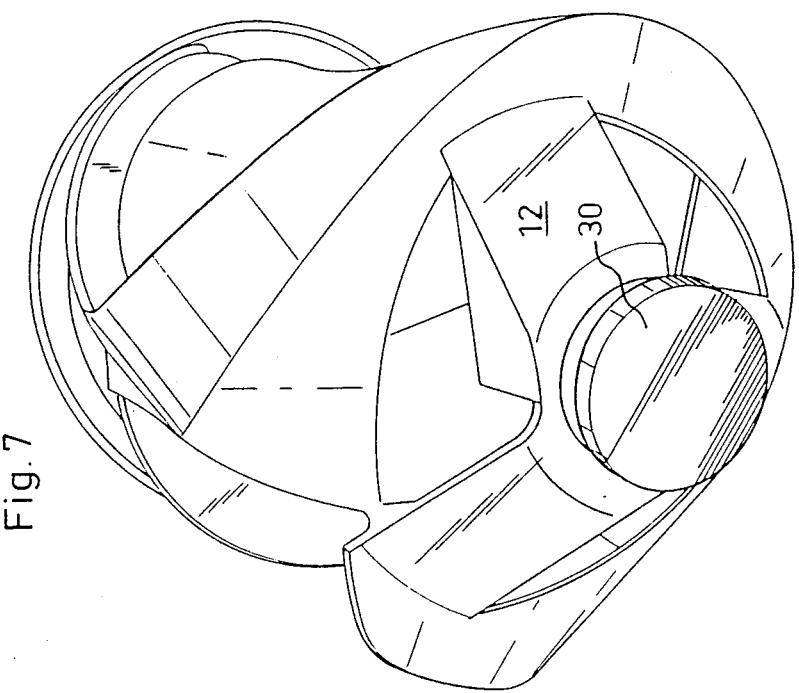
Figure 9:
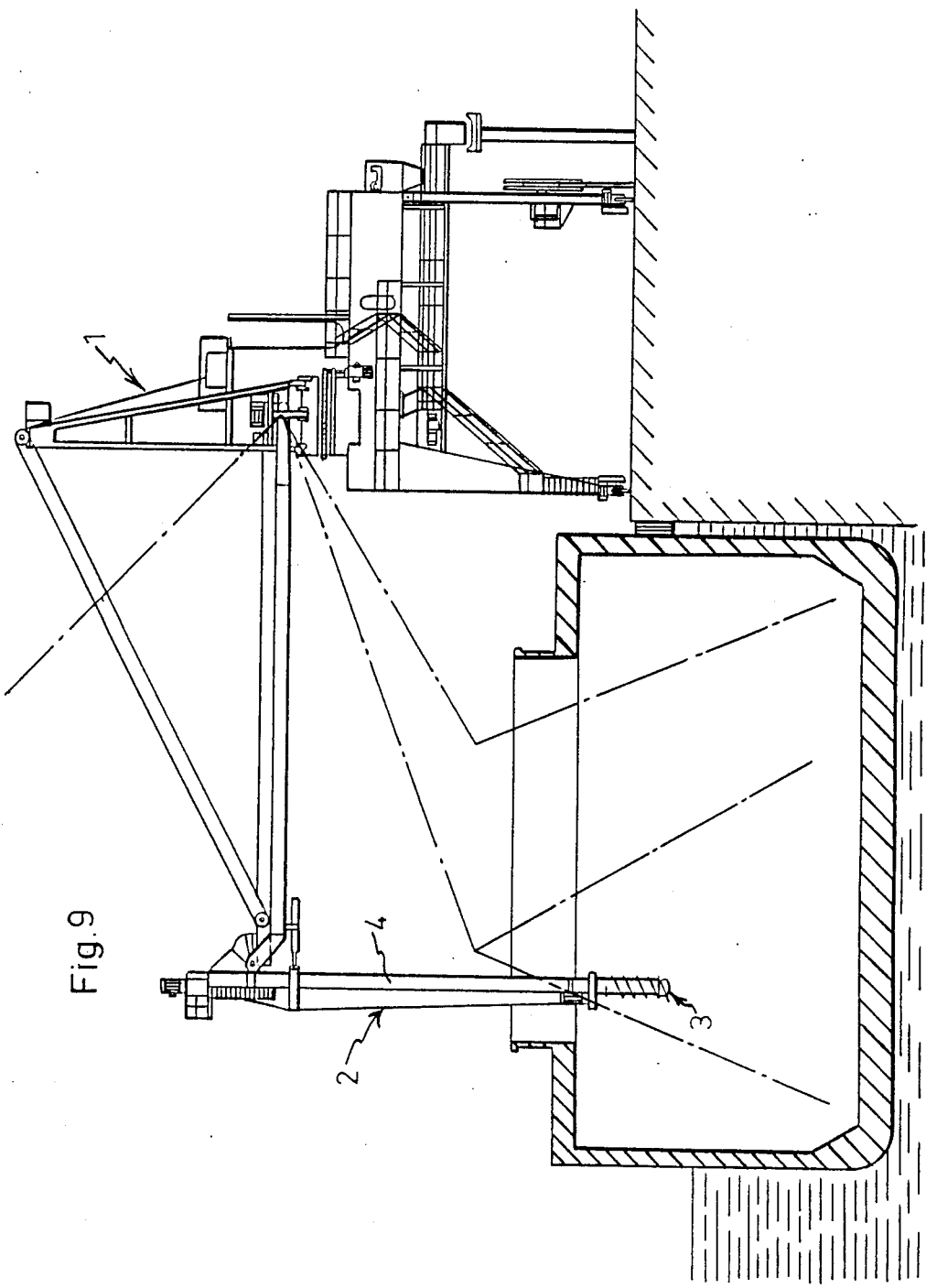
FIG. 9 illustrates an example of a complete screw conveyor equipped with a feeder device according to the invention.

FIG. 9 illustrates a ship unloading device 1, a screw conveyor 2 and feeder device 3 according to the present invention. Generally, the ship unloading device is constructed according to the U.S. Pat. No. 4,020,953. In this patent the ship unloader has a feeder of the type which constitutes the subject matter of U.S. Pat. No. 3,596,751 but which is to be replaced by a feeder device 3 according to FIGS. 1-7 in order to become a screw conveyor according to the present invention. The feeder device 3 according to FIGS. 1-7 has a tubular portion 10 surrounding the outer side of the screw conveyor housing 4, and the conveyor screw (not shown) extends downwardly through the feeder device 3 and has its shaft mounted in a bearing 11 (FIG. 6). After the feeder device 3 is rotated oppositely from the conveyor screw, the mounting of the feeder device 3 on the screw conveyor 2, the bearing 11 is covered with a lid 30. The bearing 11 has three spokes 12 serving as attachments for three curved feeder blades extending up towards the cylindrical portion 10. The cylindrical portion is connected with three inclined metal sheets or plates 13 cut out from the cylindrical portion 10 and constituting extensions thereof. A blade portion 14 is welded to the front side (to the right in FIG. 1) of the blades 13. This blade portion is an initially approximately triangular plate bent in an edge press by successive bending operations to obtain a curved shape. Outside the bent plates 14 a further bent metal plate 15 is provided. The plates 14 and 15 may be replaced by a single metal plate, the appearance of which in planar configuration will appear from FIG. 8. Also this plate may be bent in an edge press by successive bending operations indicated by dash-dot lines in FIG. 8. The plates 14, 15 are bent in such a manner that the plate 15 will connect onto the plate 14 and, besides, will obtain the shape shown in the drawings. The shape is such that the outer edge 16 of the plate 15, which engages with and digs into the material, will successively move the material upwardly and inwardly towards the screw, as may be seen from a comparison of FIGS. 4, 5, 3, 2 and 1 in the order mentioned. Because of their arcuate shape, the plates 14 and 15 will strive to draw in the material from below, from above and from the side. In other words, the plates 14, 15 perform the function of a trawl which positively guides the material towards the conveyor screw. Since the plates 14, 15 are arcuate in the manner shown, and since the three spokes 12 are inclined, this feeder device can operate very efficiently also when the screw conveyor is inclined. Inclination degrees of up to 35°-40° are entirely possible. This is due to the fact that the lower end of the feeder device in the plane of rotation is approximately spherical, although the individual blades 14, 15 are bent such that they will raise the material successively from the base and positively guide it into the screw conveyor.

The blades being designed in the manner described above, they will thus have a lower portion 17 striving to carry the material upwardly and inwardly, and an upper portion 18 striving to move the material downwardly and inwardly towards the conveyor screw. The "sphere-shaped" feeder device will thus function in the manner of a milling cutter and effectively dig loose also densely packed material.

FIGS. 1-7 illustrate an embodiment in which the blades 14, 15 proper are formed of two bent sheet metal pieces. Each piece is bent several times in an edge press, i.e. each bending has been carried out about a straight line, even though the orientation thereof is changed along the sheet metal piece. FIG. 8 shows, in planar configuration, a metal plate 19 that may replace the two plates 14, 15 if this plate is bent along the lines shown thereon. The plate 19 may be fitted such that one spoke 12 is accommodated by the space 20 and such that the edge 21 can be welded along the inclined plate 13, the edge portion 22 being welded to the outer side of the cylindrical portion 10. The digging edge 16 of the wing is, in this instance, designed in the same manner as the digging edge 16 in the embodiment according to FIGS. 1-7.

The cylindrical portion 10 has three openings 23 with an inwardly bent sheet metal flange 24 which skirts along the outer side of the screw conveyor housing 4 and serves to remove any material that may have penetrated into the gap between the cylindrical portion 10 and the screw conveyor housing 4.

It is also possible, within the scope of the invention, to utilise two spokes 12, in which case two blades are utilised. However, the bending operation will then be more difficult. Also four spokes and four blades are conceivable, but the optimum result is provided by a design comprising three blades and three spokes, as shown in the drawings.

As will appear from FIG. 6, the spokes 12 may be extended by a sheet metal piece 25 which is provided on the lee side of the blade 14, 15 and which is especially advantageous for conveying material tending to become fluidised. The sheet metal piece 25 here gives a certain throttling effect to prevent overcapacity in the case of fluidizing materials.

I claim:

1. A screw conveyor for taking up bulk material, especially from ships, comprising
   a conveyor screw rotatable within a housing extending along said screw conveyor and having, at its intake end,
   a feeder device adapted to promote the transport of material to the conveyor screw, said conveyor screw and said feeder device being adapted to rotate in opposite directions, and said conveyor screw projecting into said feeder device, and
   said feeder device having spokes on which blades are mounted for conveying the material inwardly towards said conveyor screw,
   wherein said blades (14, 15) have upwardly and downwardly extending portions (18 and 17, respectively), and are curved in a trawl-like manner for drawing the material into the feeder device, a lower part (17) of said blades being adapted to raise the material and move it inwardly towards the feeder device, and an upper part (18) of said blades being adapted to draw the material downwardly and inwardly into said feeder device.

2. A screw conveyor as claimed in claim 1, wherein the feeder device has three blades (14, 15) arranged symmetrically, such that the feeder device upon rotation resembles a sphere.

3. A screw conveyor as claimed in claim 1, wherein said feeder device has an upper cylindrical portion (10) which is extended by downwardly directed plates (13) extending substantially along a cylindrical surface, said blades (14, 15) projecting from said plates (13).

4. A screw conveyor as claimed in claim 1, wherein said blades (14, 15) comprise a plurality of plates (14, 15, 19), each bent several times along straight lines.

* * * * *